Patented June 28, 1949

2,474,506

UNITED STATES PATENT OFFICE 2,474,506

METHOD OF MAKING PHOSPHOR MATERIALS

Elton J. Wood, Hopewell, N. J., assignor to Radio Corporation of America, a corporation of Delaware No Drawing. Application January 4, 1946, Serial No. 639,155

4 Claims. (Cl. 252—301.6)

Many phosphors are known that exhibit varying degrees of phosphorescence, and of these some have rates of decay which are increased by infra red radiation, while others are substantially unaffected by such radiation.

In some uses where relatively long persistence of phosphorescence is desirable, there are times when it is expedient to quickly quench the phosphorescence. As one example I may mention radar indicator tubes. In the use of the usual indicator tubes, the rapid change from one range to another is made difficult by the persistence of old information on the tube screen for longer periods than the time required to change the range. This produces jumbled information.

It is an object of this invention to provide a phosphor material that can be suddenly quenched by application of infra red radiation.

It is another object of this invention to produce a phosphor of relatively great intensity and long persistence which can be immediately extinguished whenever desired.

Zinc sulphide activated by copper or silver is known to be a good phosphor of long persistence, but when made by prior art methods it is not efficiently quenched by infra red radiation. I have discovered a method of making a zinc sulphide that is markedly subject to the quenching effect of infra red radiation without detracting from the other desirable characteristics of such phosphor. In fact, the intensity and persistence of the phosphorescence is increased at the same time the susceptibility to quenching is increased.

The particular phosphor materials used in my new process may be varied depending upon the color and intensity of fluorescence and phosphorescence, but as one example I will describe the preparation of a sulphide phosphor.

In a typical preparation, 100 grams of zinc sulphide, 1 gram of zinc oxide and 0.005 gram of copper, preferably added in the form of a soluble salt, are mixed with a fluxing agent, such as 5 grams of sodium chloride and 2 grams of barium chloride, and then crystallized by heating to a temperature between 1100° C. and 1200° C. for a total time of thirty hours. The crystallized mass is then ground after cooling and applied in known ways to the target or screen of the tube.

When a phosphor material made in the way described is used, for example, on a screen of a radar indicator tube, the received information may be suddenly wiped off by projecting infra red rays on the screen. This wipes off the information obtained from one range adjustment and sets the target for the succeeding range adjustment. The previous application of infra red radiation to the screen has no noticeable effect on the information obtained immediately after the previous information is wiped off.

To show the comparative action of a phosphor prepared from materials by my method and a phosphor prepared from the same materials by the standard method of heating for only twenty minutes, it may be said that the information was wiped off completely in one second, whereas with the phosphor prepared by the standard heat treatment it could be wiped off only in 43 seconds.

In the zinc sulphide phosphor, cadmium sulphide may be substituted for part of the zinc sulphide, but large proportions of cadmium sulphide reduce the quenching effect.

In the example given, the zinc oxide content may be varied from ½ to 20%, or the zinc oxide may be partially or wholly replaced by zinc fluoride. The copper may be varied from 0.0001% to 0.07% and silver may be used up to 0.1% either with copper or in place thereof. A maximum of 25% flux may be used, consisting of any alkali metal halide or ammonium halide, except the iodide, used singly or in combination. In all cases the percentage given is taken of the total sulphide weight.

Crystallization may also be carried out at temperatures between 1000° C. and 1400° C. for a time dependent upon the quantity of material and construction of the furnace. The minimum time should be at least five hours heating after that temperature is reached, but preferably longer, as the long period of heating is the most essential part of the method.

The reason for the marked increased in quenching effect by the new method is not known, but it may be due to the formation of sulphate by the long heating. It is known that complex compounds like zinc sodium and barium sulphates readily absorb infra red radiation, while simple binary compounds like zinc sulphide poorly absorb it. The energy absorbed by the sulphate would be available to quench the phosphorescence of the sulphide if the sulphate is incorporated in the phosphor. Obviously those sulphates which are stable and do not decompose readily at the firing temperature of the phosphor and are not removed by the conventional washing of the phosphor in water are present in the phosphor to exert the quenching action.

I have omitted zinc oxide from the mixture of materials as above given and have obtained a product with the same susceptibility to quenching by infra red energy. If the supposition is correct that sulphate is formed and accelerates the quenching effect, the oxygen required for formation of the sulphate could be supplied from the air leaking into the crucible, as the heating was not carried out in a neutral atmosphere.

I claim:

1. The method of preparing a phosphor adapted for rapid quenching by infra red wave energy which consists in heating to temperatures of 1000° C. to 1400° C. for five to thirty hours in air, a mixture of zinc sulphide, a member in activator proportions selected from the group consisting of copper and silver and mixtures thereof and a flux of 5% to 25% of a halide of an alkali metal and excluding the iodide and ammonium, said percentages being based on the weight of the zinc sulphide.

2. The method of preparing a phosphor adapted for rapid quenching by infra red wave energy which consists in heating to temperatures of 1000° C. to 1400° C. for five to thirty hours in air a mixture of zinc sulphide, ½% to 20% zinc oxide and a member in activator proportions selected from the group consisting of copper and silver and mixtures thereof with a flux of 5% to 25% of a halide of alkali metal and ammonium excluding the iodide, said percentages being based on the weight of the zinc sulphide.

3. The method of preparing a phosphor adapted for rapid quenching by infra red wave energy which consists in heating to temperatures of 1000° C. to 1400° C. for five hours to thirty hours in air, a mixture of zinc sulphide, a member in activator proportions selected from the group consisting of copper and silver and mixtures thereof, and a flux consisting of 5% sodium chloride and 2% barium chloride, said percentages being based on the weight of the zinc sulphide.

4. The method of preparing a phosphor adapted for rapid quenching by infra red wave energy which consists in heating to temperatures of 1000° C. to 1400° C. for five to thirty hours in air, a mixture of zinc sulphide, ½% to 20% zinc oxide, a member in activator proportions selected from the group consisting of copper and silver and mixtures thereof and a flux consisting of 5% sodium chloride and 2% barium chloride said percentages being based on the weight of the zinc sulphide.

ELTON J. WOOD.

REFERENCES CITED

The following references are of record in the file of this patent:

UNITED STATES PATENTS

| Number | Name | Date |
|---|---|---|
| 2,136,871 | Wakenhut | Nov. 15, 1938 |
| 2,220,894 | Einig | Nov. 12, 1940 |
| 2,397,666 | Isenberg | Apr. 2, 1946 |
| 2,402,759 | Leverenz | June 25, 1946 |

FOREIGN PATENTS

| Number | Country | Date |
|---|---|---|
| 776,084 | France | Oct. 22, 1934 |